United States Patent
Pereira et al.

(10) Patent No.: US 7,506,586 B1
(45) Date of Patent: Mar. 24, 2009

(54) MUNITIONS ENERGY SYSTEM

(75) Inventors: Carlos M. Pereira, Tannersville, PA (US); Chris Janow, Bloomingdale, NJ (US); Charles William McMullan, Newton, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/462,149

(22) Filed: Aug. 3, 2006

Related U.S. Application Data (60) Provisional application No. 60/595,775, filed on Aug. 4, 2005.

(51) Int. Cl.
*F42B 99/00* (2006.01)
*H02N 3/00* (2006.01)
*H02N 6/00* (2006.01)

(52) U.S. Cl. .................. 102/207; 102/210
(58) Field of Classification Search ........... 102/207, 102/210, 206, 208, 209, 473, 501, 200; 310/306, 310/311
See application file for complete search history.

(56) References Cited

U.S. PATENT DOCUMENTS

| 4,421,029 A * | 12/1983 | Wich ..................... 102/207 |
| 7,231,874 B2 * | 6/2007 | Rastegar et al. ........ 102/207 |
| 2003/0041767 A1 * | 3/2003 | Rastegar et al. ........ 102/207 |
| 2006/0033406 A1 * | 2/2006 | Rastegar et al. ........ 310/339 |
| 2006/0281435 A1 * | 12/2006 | Shearer et al. .......... 455/343.1 |

* cited by examiner

*Primary Examiner*—James S Bergin
(74) *Attorney, Agent, or Firm*—John F. Moran (57) ABSTRACT

A munitions energy system combines various sources of energy generation with energy storage to provide power to a munition through various stages of the munition's operation. The system uses energy harvesting technologies which convert energy captured from the environment of the munition to electrical power which can be used to meet the munition's power needs. Energy can be harvested from the mechanical, thermal, and electromagnetic environment of the munition. The harvested energy can be stored by the system for later use. The system can also receive energy from conventional sources such as batteries and manage the energy from all sources to meet the power requirements of the munition.

12 Claims, 10 Drawing Sheets

W = 11.267mm
L = 9.2mm
W1 = 0.427mm
W2 = 1.564mm $\frac{\lambda_c}{4} = 4.9872$

MUNITIONS ENERGY SYSTEM

CROSS-REFERENCE TO RELATED APPLICATIONS

The present application claims priority from U.S. Provisional Patent Application No. 60/595,775, which was filed Aug. 4, 2005 and which is incorporated herein by reference in its entirety.

FIELD OF THE INVENTION

The present invention relates generally to energy systems and, in particular, it relates to energy systems for powering munitions.

BACKGROUND OF THE INVENTION

Current and future munitions energy systems need to be able to provide power for munitions having an ever increasing number of sensors, actuators, and communications requirements. Furthermore, for some munitions, power consumption takes place before, during and after the launch of the munition.

Existing munition energy systems suffer from several problems, including low reliability, limited shelf life, poor gun launch survivability, and high cost. Common causes of low reliability are the need for multiple batteries and their construction. For long shelf life and high reliability, thermal or liquid reserve battery technologies are typically used in which the reactive components of the battery system remain separated until needed. A disadvantage of such systems is primarily the time needed to mix the reactive components and bring the battery output voltage to the desired level. This process is often started using the launch acceleration forces of the munition system and typically takes a set amount of time, up to approximately 30 milliseconds. If power is required during the period of time that the munition is in the launch tube and until the battery system is fully up, another battery system, typically a lithium-based battery system, is often used. Lithium battery technologies, however, are prone to leakage and have much lower shelf lives when compared to thermal or liquid reserve batteries. The second battery system which is added to provide power during the early portions of the launch thus severely degrades the performance of the munition energy system, its shelf life and survivability.

In addition to shelf-life, reliability and survivability, the powering of gun-fired munitions presents additional challenges including, for example, the ability to be stored and operate over wide temperature ranges; acceleration forces ranging from ten to one hundred thousand times the weight of the system; and strict limitations on the volume of space available for housing the energy system.

Moreover, the development of guided munitions and increasing electronic functionality has placed numerous demands on munitions energy systems that did not exist in previous generations of munitions. A significant demand is the requirement to power sensors and actuators, process signals, and communicate much earlier in the flight of smart munitions, sometimes while a munition is inside the gun barrel and during launch.

To overcome the drawbacks of thermal or liquid reserve battery technologies, other battery technologies are being used that allow power to be readily available when needed. The problem with such battery technologies is that these have much lower shelf lives, limited temperature performance and perform poorly in high "G" environments. Older battery technologies often require multiple batteries, have poor shelf life and temperature performance, are large, occupying precious munition volume, have poor acceleration performance, are expensive to produce, and are unreliable.

The issue of volume occupied by the energy system, particularly the batteries, is further exacerbated for gun-fired munitions. Such munitions are subject to very high accelerations during firing with accelerations in the range of 10,000 to 70,000 Gs. In addition, such munitions are commonly subjected to high levels of vibration during transportation and loading. These conditions necessitate the provision of appropriate means to isolate and protect the batteries and their related components (e.g., contacts, wiring, electronics) from damage such as breakage due to plastic deformation, fatigue or other modes of failure or improper operation. Therefore, even more space is required for the housing and protection of the energy systems of gun-fired munitions. As a result, a considerable portion of the available space must be assigned to house the batteries and their related components.

In addition to the aforementioned problems, conventional energy systems for munitions also face problems related to deterioration during long periods of storage (e.g., twenty years), and the high cost of production and assembly of the projectile and the related hardening efforts and testing, among others.

A need therefore exists for munitions energy systems that overcome the aforementioned drawbacks of known systems.

SUMMARY OF THE INVENTION

The present invention is directed to munitions energy systems which manage energy generation and storage resources to reliably provide advanced munitions with power over a wide range of operating conditions and throughout various phases and modes of the munitions' operation. An exemplary embodiment of a munitions energy system in accordance with the present invention manages energy harvested from the environment of the munition using one or more energy harvesting devices. An exemplary embodiment of the present invention includes at least one of an electromagnetic energy harvesting device, an acceleration harvesting device, and a thermal energy harvesting device. An energy storage device is also preferably included to store the harvested energy when it exceeds the present energy requirements of the munition and to meet anticipated energy needs (e.g., the eventually fuzing of the munition's explosives). The system may also manage energy from conventional batteries for additional power requirements.

The munitions energy system of the present invention also meets the strict requirements imposed by munitions applications, including: survivability in the face of extreme accelerations and temperatures; long shelf-life (e.g., 20 years); and limited available volume. Furthermore, the system of the present invention can be implemented at lower cost and with greater manufacturability and reliability than conventional systems.

The above and other aspects and advantages of the present invention are described in greater detail below.

DETAILED DESCRIPTION OF THE PREFERRED EMBODIMENTS

Figure 1:
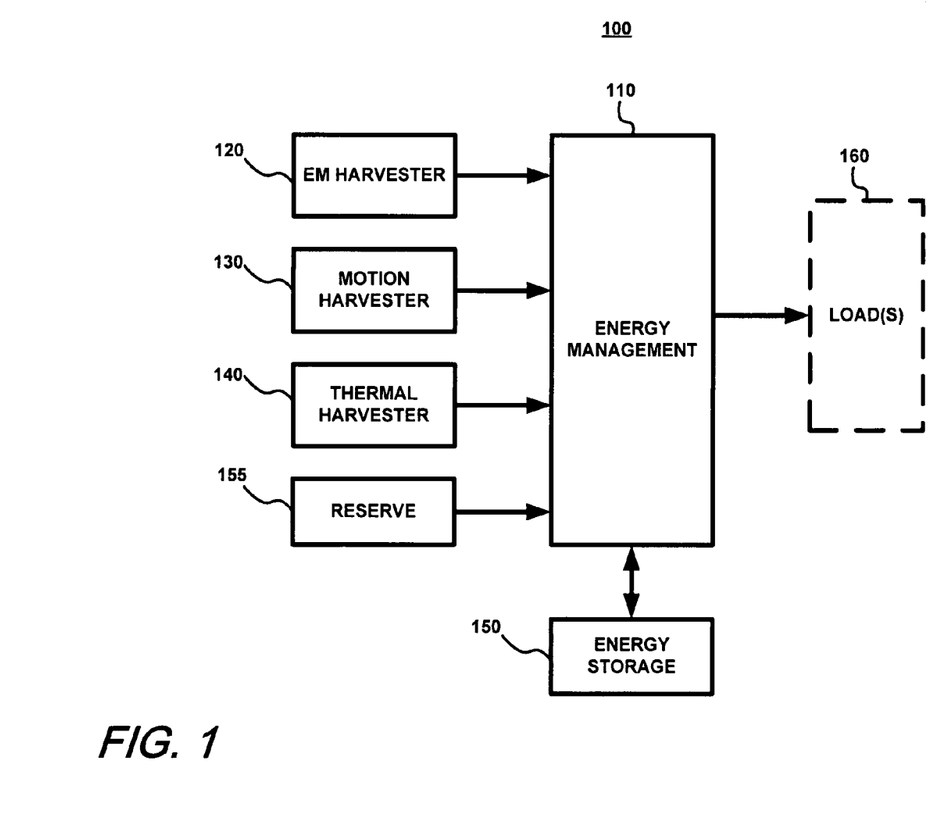
FIG. 1 is a block diagram of an exemplary embodiment of a munitions energy system in accordance with the present invention.

FIG. 1 shows a block diagram of an exemplary embodiment of a munitions energy system 100 in accordance with the present invention. The exemplary system 100 includes an energy management unit 110 which interacts with one or more energy harvesting devices, including, for example, an electromagnetic (EM) harvester 120, a motion harvester 130, and a thermal harvester 140. The energy harvesting devices harvest energy from the environment of the munition and may include other devices not listed herein. Exemplary energy harvesting device are described in greater detail below. The system 100 also includes an energy storage device 150 which can provide as well as receive energy. The energy storage device 150 may include, for example, one or more rechargeable batteries, capacitors, or the like. As will be understood, the specific implementation of the storage device 150 will depend on the application. In an exemplary embodiment, the energy storage device 150 can be implemented using a solid-state super-capacitor.

The system 100 may include one or more reserve energy devices 155, such as batteries, to provide electrical energy for certain applications and conditions. For example, there may be a need to deliver power when the energy harvesting devices 120-140 or the energy storage device 150 are unable to do so. In an exemplary embodiment, the reserve energy devices 155 may include thermal or liquid reserve batteries in which the reactive components of the battery system remain separated until needed. Although meeting long shelf-life requirements (e.g., 20 years), there is a delay associated with mixing the reactive components and bringing the battery output voltage to a desired level. Other battery technologies, such as lithium batteries, for instance, may also be used for the reserve energy devices 155, depending on the particular application requirements.

As described in greater detail below, the energy management unit 110 manages the flow of energy from the one or more energy harvesting devices 120-140, the reserve energy source 155, and the energy storage device 150 to one or more loads 160 of the munitions system. The loads 160 may represent any energy-consuming sub-system or device of the munitions system, such as a fuze, actuators, sensors, processors, guidance sub-systems, and/or communications sub-systems, among others. Depending on the energy requirements and the operational mode of the munitions system, the energy management unit 110 may direct energy to any one or all of the loads 160 from any one or all of the energy harvesting devices 120-140, the reserve energy source 155, and the energy storage device 150.

Additionally, the energy management unit 110 manages the flow of energy from the energy harvesting devices 120-140 to the energy storage device 150. For example, if the energy harvesting devices 120-140 are generating more energy than the loads 160 are consuming, the excess energy can be directed to and stored in the energy storage device 150. The energy stored in the device 150 is available for use at a later time, as determined by the energy management unit 110 based on the load requirements.

The energy management unit 110 can be implemented in a variety of ways and may include, for example, a microprocessor and/or dedicated digital logic among other circuitry. The operation of the energy management unit 110 will be described in greater detail below.

The EM harvester 120 uses energy captured from electromagnetic radiation to generate electrical power. The electromagnetic radiation may include, for example, a communications signal transmitted to the munition from a munitions control system during the pre-launch portion (i.e., while the munition is sitting in the breech of a gun) and/or the launch portion of the munition's operation. Advantageously, the barrel of a gun serves as a good waveguide for a high frequency EM signal. Although the energy to be harvested by this technique is relatively small compared to the other harvesting techniques described below, it has been demonstrated to be at least sufficient to power the communications circuitry, receive and store information in the munition, and to place the circuitry onboard the munition to sleep. In an exemplary embodiment, the RF harvester 120 can be implemented in greater detail below.

The motion harvester 130 can generate electrical power in accordance with the accelerations experienced by the munition, such as, for example, the accelerations experienced by the munition upon firing or due to vibrations. In an exemplary embodiment, the motion harvester 130 is implemented as described in U.S. Published Patent Application No. 2006/0033406, entitled METHODS AND APPARATUS FOR POWER GENERATION, and incorporated herein by reference in its entirety. The device described therein uses a small mass-spring system to store energy captured during acceleration of the munition (such as upon firing). After acceleration, the mass-spring system continues to transfer the stored mechanical energy to a piezoelectric element which generates electrical power. Additionally, the motion harvester 130 will also harvest energy from vibrations to which the munition is subjected.

The voltage generated by the piezoelectric element of the motion harvester 130 can be varied by selecting the number of layers in the piezoelectric stack. Voltages of 24-48 volts or higher are readily available.

The vibrational environment of munition systems is complex. When a munition is launch, most of the shock and vibration is in the axial direction, but there is also vibration along the other two orthogonal directions. In an exemplary embodiment, motion harvesters may be mounted in all three directions to collectively transduce the mechanical vibration into electrical energy. Electrical energy from all three directions is regulated and combined to produce electrical energy.

An exemplary motion harvester was simulated and tested at two distinct acceleration levels. At 10,000 G's, for a period of 2 seconds, the total energy harvested was calculated to be 22.6 mW. At 70,000 G's, the total energy harvested was calculated to be 158 mW.

The thermal harvester 140 generates electrical power from thermal energy captured from the surface of the munition. The surfaces of high-performance munitions traveling at supersonic speeds typically become super-heated with the nose surface area and the leading edges of the munition attaining temperatures often in excess of 2000 degrees F. Such friction-induced heating provides very high energy density which can be harvested using Thermophotovoltaic (TPV) devices. TPV power sources are significantly more efficient than photovoltaic cells, since they are tuned to efficiently absorb energy in a particular band that is emitted from specifically designed emitters, usually ceramics.

TPV cells, integrated into the nose of supersonic projectiles and their leading edges can provide a relatively large amount of power with minimal required space, thereby significantly reducing the required capacity and thus the volume of energy storage devices 150 or other sources of power. This frees up space for other components such as sensors, actuators, guidance and control components, as well as explosives.

Additional detailed description of exemplary embodiments of the thermal and EM energy harvesters is provided below.

The operation of the exemplary munitions energy system of the present invention will now be described with reference to FIG. 2. In an exemplary embodiment, the munition is assumed to have two modes of operation: 1) an operational mode, where the munition is used to fire at and destroy a target; and 2) a maintenance mode, where information about the munition is collected for inventory and monitoring.

Figure 2:
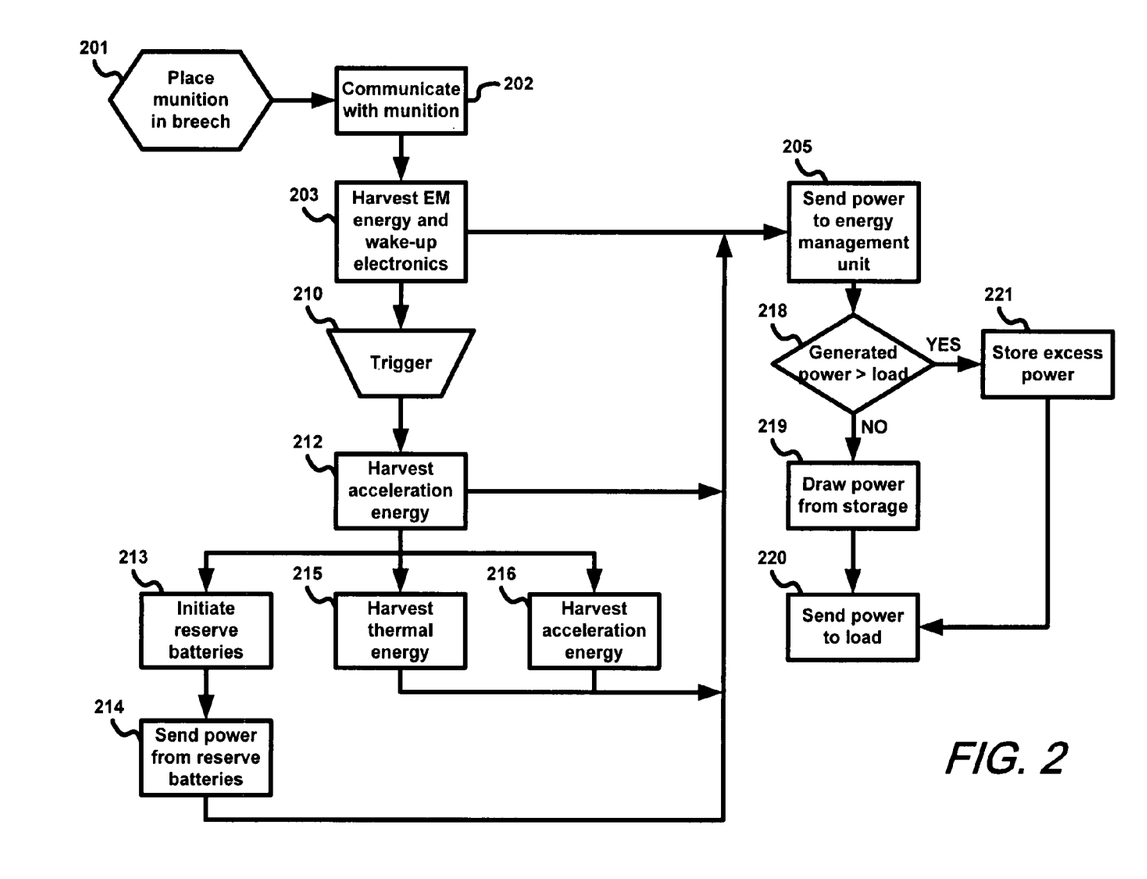
FIG. 2 is a flow chart illustrating the operation of an exemplary embodiment of a munitions energy system in accordance with the present invention.

Referring to FIG. 2, the operational mode of a munition can be said to begin, at 201, with the placement of the munition in the breech of a gun from which the munition is to be fired. This is followed at 202 by the establishment of an RF communication link between the munitions control system and the munition. This communication link is typically used, for example, to provide targeting and navigation information to the munition. Some of the EM energy of the RF link is harvested, at 203, by the EM harvester and provided, at 205, to the energy management unit of the munitions energy system in order to power-up electronic circuitry in the munition, such as the circuitry involved in the RF communication link and the processing of the information provided to the munition. After the exchange of information, the electronic circuitry in the munition can then be put to sleep to conserve energy in the event that the munition is not fired immediately. This completes the pre-launch stage.

The next step is the actual firing of the munition, which is initiated at 210 by triggering the gun. Firing the munition generates a large axial setback acceleration which is used by the motion harvester to generate electricity at 212. The axial setback acceleration also initiates any reserve batteries at 213. In the meantime, as the munition reaches supersonic flight speeds, its nose cone will start to heat up enough for the thermal energy harvester (e.g., TPV cells) to begin producing electricity, at 215. Additionally, the motion harvester continues (at 216) to generate electricity from the stored energy of the setback acceleration and/or from the vibrational environment to which the munition is subjected.

The power output by the energy harvesting devices are provided to the energy management unit at 205. This completes the post launch sequence as the next stage, referred to as the flight time sequence, begins. Before the reserve batteries have come up to full power, the power provided by the harvesting devices can be used to wake up the electronics and to power the system until the reserve batteries are fully up. At 214, the reserve batteries will be up to full power output, up to approximately 30 ms after launch, and their power will be provided to the energy management unit 205. At this point, all of the electronics can be woken up and fully powered.

As described above, throughout the pre-launch, launch, post-launch and flight time portions of the munition's operation, power output from some or all of the energy harvesting devices and the reserve batteries will be sent to the energy management unit at 205. At 218, the energy management unit determines whether the power generated is sufficient to meet the load power requirements, e.g., whether there is enough power for the munitions electronics and to fuze the munition explosives at the appropriate time. If the power generated exceeds the load requirements, the excess power is stored at 221, otherwise, power is drawn from the storage device at 219 and/or the reserve batteries. As the energy management unit receives power from the various sources, it repeatedly determines if the power it is receiving meets the present and anticipated requirements of the load (e.g., fuze), and charges or discharges the energy storage device as necessary in order to meet those requirements. At 220, the power is delivered to the load, as needed.

In the maintenance mode, the munition receives and/or transmits data over an RF communications link with a wireless communications terminal or the like. Over this link, the munition may transmit information such as identifying data, its age, its place of origin, and/or a history of the environmental conditions it has been subjected to, among other possibilities. The EM energy harvester can harvest sufficient energy from the RF signal emitted by the wireless communications terminal in order to power the RF communication circuitry of the munition to communicate with the wireless communications terminal. Harvested energy can also be stored in the storage device. Once the communication has been completed, the electronics can then be put to sleep.

Figure 3A:
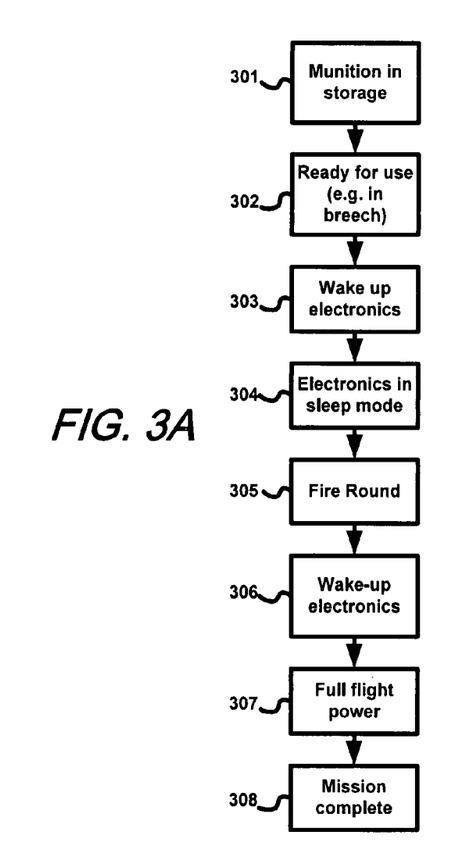
FIGS. 3A and 3B are flow diagrams illustrating the operational and maintenance modes in which an exemplary munitions energy system in accordance with the present invention can operate.
Figure 3B:
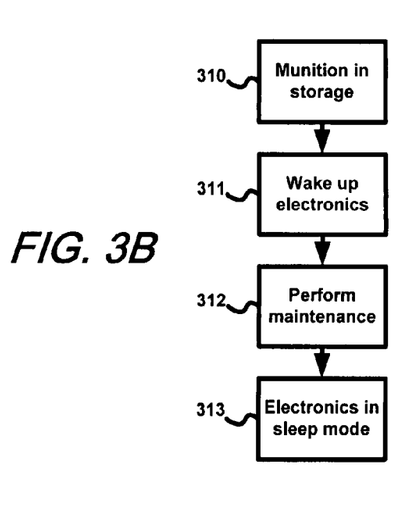

FIGS. 3A and 3B are flow diagrams that summarize exemplary embodiments of the operational and maintenance modes, respectively, mentioned above. As shown in FIG. 3A, in an exemplary operational mode, the munition starts in storage (301), is then placed in the gun breech (302) and its electronics are awakened (303) with power provided, for example, from EM harvesting while in the breech. Until the munition is fired (305), the electronics can be put back into sleep mode (304), to conserve power. Once the munition is fired, the electronics are awakened (306) again, with power provided by motion harvesting. Once in flight, power can also be provided by thermal harvesting for full power generation (307). Any excess power is stored and used for fuzing, or the like, to complete the mission (308).

In an exemplary maintenance mode, shown in FIG. 3B, the munition, which typically will be in storage (310), is awakened (311) with power from EM harvesting. With the electronics awake, maintenance is performed (312), which may entail, for example, the exchange of information between the munition and an external communications device, or the like. Once maintenance has been completed, the munition re-enters the sleep mode (313).

The exemplary system described above can be applied to any munition that requires electrical power before, during and after launch. The particular power sources that would be included in an actual implementation could be varied based on the functionality and requirements of the system. For example, some munitions may require pre-launch power whereas others may not. As such, an energy system for the latter can be implemented without an EM energy harvester.

In addition to acting as the sole or primary energy system of a munition, exemplary embodiments of the system of the present invention can be used to supplement the conventional energy systems of munitions, thereby, for example, reducing the number and/or size of batteries that may be required, particularly for long-range missions.

Exemplary embodiments of the various energy harvesters discussed above will now be described in detail.

Thermal Energy Harvesting

With respect to the harvesting of thermal energy in the context of munitions, the main source of heating of the nose and leading edges of projectiles during supersonic flight is the detached bow wave. A typical munition in flight can be modeled as a solid, axially symmetric aerodynamic body with a blunt bow, with an adiabatic, frictionless and calorically perfect gas steadily flowing over the body parallel to the axis of rotation (z-axis). A detached bow shock wave will exist if the free-stream flow velocity is supersonic. In the region near the nose and the z-axis, the flow can be assumed to be one-dimensional and, hence, normal shock relations can be used to find the heating of the flow aft of the shock.

The one-dimensional conservation laws are as follows:

$$\rho_1 u_1 = \rho_2 u_2 \quad (1)$$
$$P_1 + \rho_1 u_1^2 = P_2 + \rho_2 u_2^2$$
$$h_1 + \frac{1}{2} u_1^2 = h_2 + \frac{1}{2} u_2^2$$

where subscripts 1 and 2 refer to states upstream and downstream of the shock, respectively, $\rho$ is density, u is velocity in the z direction, P is the pressure and h is the enthalpy.

The speed of sound can be defined as follows:

$$a^2 = \gamma P/\rho, \quad (2)$$

where $\gamma$ is the ratio of specific heats. The Mach number is M=u/a and, per the equation of state:

$$P = \rho R T$$
$$h = C_P T$$
$$R = C_P - C_v \quad (3)$$

where R is the gas constant, $C_P$ is the specific heat at constant pressure, $C_v$ is the specific heat at constant volume, and $\gamma = C_P/C_v$. Combining with the above equations yields the following:

$$\rho_1/\rho_2 = \frac{(\gamma+1)M_1^2}{2+(\gamma-1)M_1^2}, \quad (4)$$

$$P_2/P_1 = 1 + \frac{2\gamma(M_1^2-1)}{\gamma+1}.$$

Through the equation of state, the temperature jump equation can be derived:

$$T_2/T_1 = [P_2/P_1][\rho_2/\rho_1] \quad (5)$$

Equation 5 thereby provides the temperature of the flow just aft of the shock in terms of $\gamma$ and the free-stream Mach number $M_1$. For a diatomic gas at reasonable temperatures, $\gamma=1.4$. Standard atmospheric tables can be used to estimate the ambient temperature at various altitudes.

The shock is forward of the nose at a set standoff distance. The flow will undergo more heating as it stagnates at the body and through viscous heating. The derived temperature ratio equation (Eq. 5) will therefore provide a reasonable lower bound on the temperature at the surfaces around the nose of the projectile.

Figure 4:
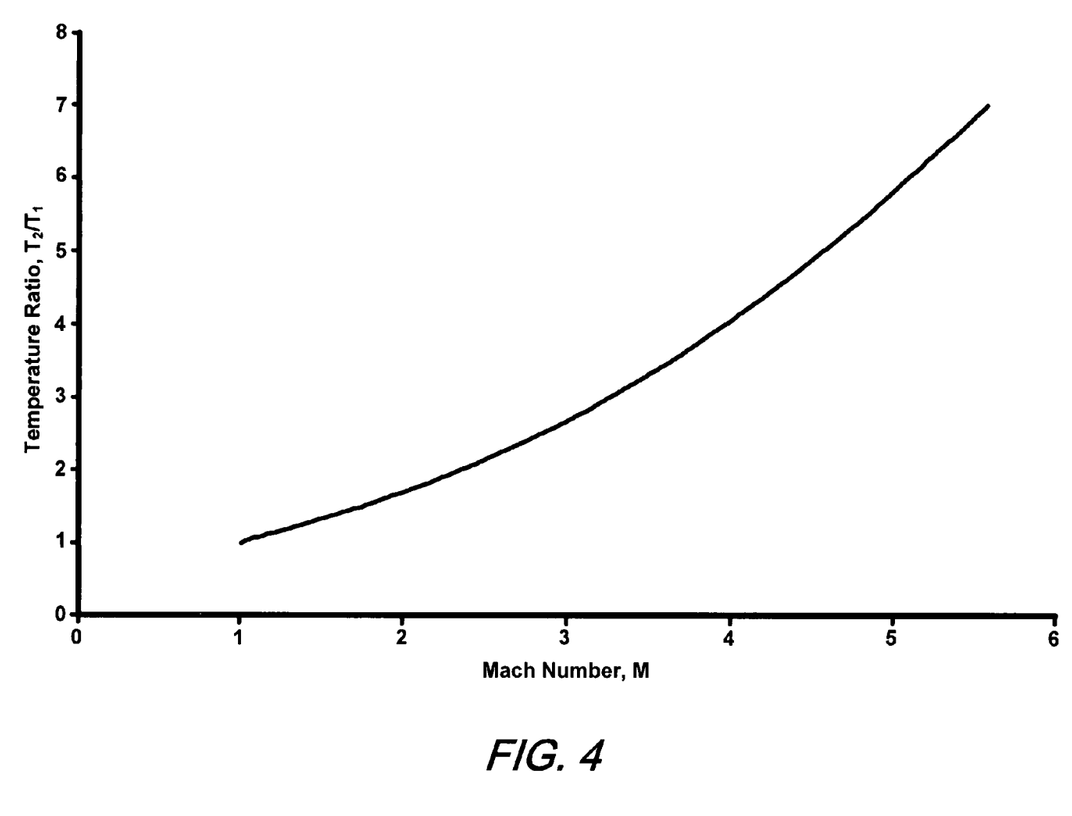
FIG. 4 is a graph showing the relationship between the surface temperature and velocity of a projectile.

Using the temperature ratio equation (Eq. 5), a plot of the temperature ratio $T_2/T_1$ versus the Mach number is obtained and is shown in FIG. 4. For example for an ambient temperature of 300 degrees Kelvin (equivalent to about 27 degrees C. or 80 degrees F.), the nose of a projectile traveling at M=5 would be heated to temperatures in excess of 5.9×300=1770 degrees Kelvin (approximately 1500 degrees C. or 2700 degrees F.).

Figure 5A:
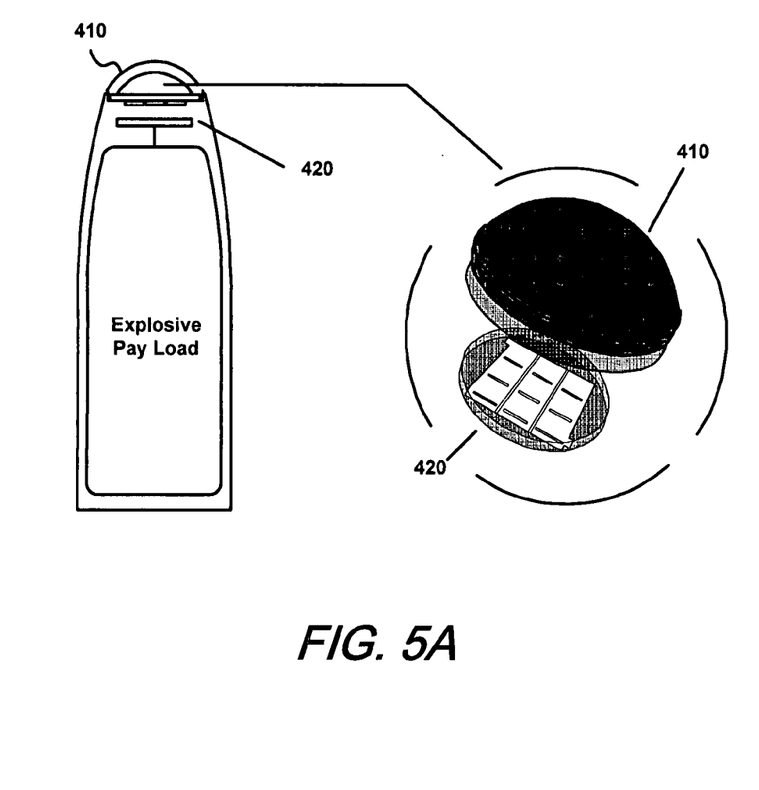
FIGS. 5A and 5B illustrate an exemplary embodiment of a thermal harvesting arrangement in accordance with the present invention.
Figure 5B:
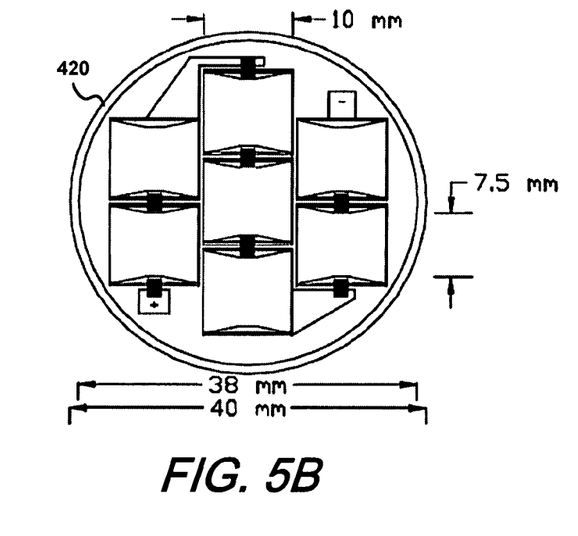

The noses of supersonic projectiles are typically constructed of high-temperature materials, such as ceramics, which glow when heated and emit infrared (IR) light. As the munition attains supersonic speeds soon after firing, the nose and other leading edges will heat up and glow IR light. As shown in FIG. 5A, by mounting infrared (IR) sensitive photovoltaic cells 420 inside the projectile behind the glowing nose 410, it is possible to harvest the energy thus emitted by the nose. These cells will then receive the IR and convert that IR energy into electrical power for fusing and other similar purposes. Cells that can be used for this purpose, include, for example, GaSb cells available from JX Crystals. As shown in FIG. 5B, an exemplary arrangement 420 of seven IR cells are coupled in series. The arrangement 420 may also be potted with a protective material.

Figure 6:
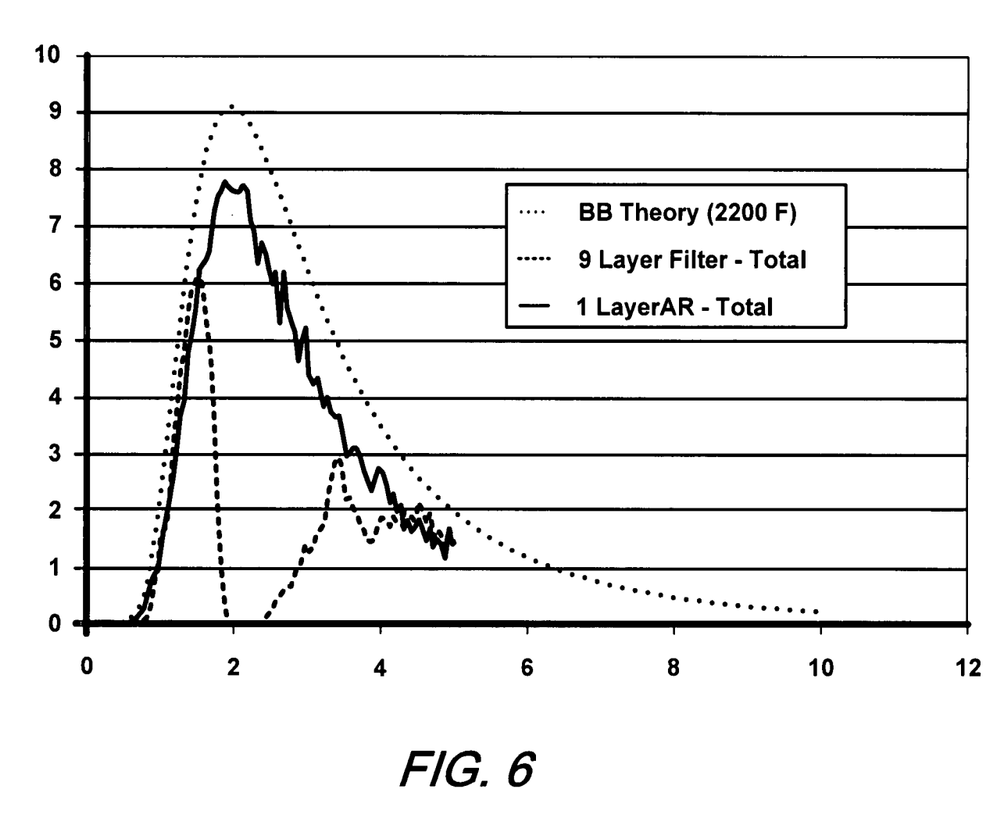
FIG. 6 is a graph of radiation spectra incident on a detector of an exemplary embodiment of a thermal harvesting arrangement in accordance with the present invention.

Simulation of an exemplary arrangement of a thermal energy harvester such as that of FIGS. 5A and 5B yields the results shown in Table 1 below. The simulation was based on a 40 mm conical projectile nose modeled as a black body at 2200 F. The spectra emitted by the cone and incident on the IR cell circuit were calculated and are graphed in FIG. 6. The three traces in FIG. 6 illustrate the results of emitting photons through three different filters. The cell current density was then calculated to be approximately 5 A/cm². Potting the IR cells was shown to reduce the short circuit currents by approximately 8%.

TABLE 1

| | |
|---|---|
| Current density before potting | 5 A/cm2 |
| Current density after potting | 4.6 A/cm2 (measured 8% down) |
| Current | 0.75 cm² × 4.6 A/cm² = 3.45 A |
| 7 cell circuit open-circuit voltage ($V_{oc}$) | 3.5 V |
| Circuit fill factor | 0.65 |
| Projected circuit power output | 7.8 W |

Figure 7:
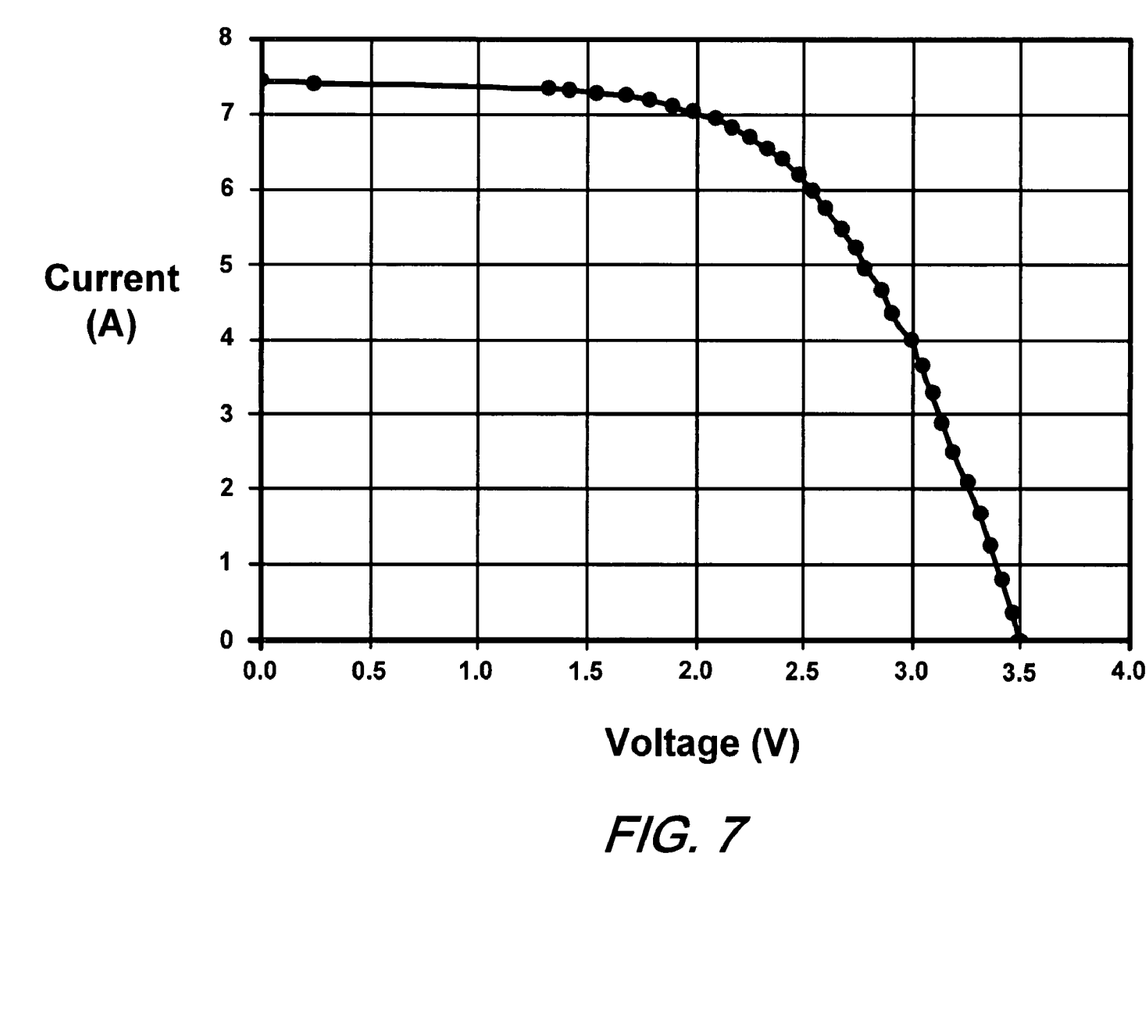
FIG. 7 is a graph of current vs. voltage for an exemplary embodiment of a thermal harvesting arrangement in accordance with the present invention.

FIG. 7 shows the current vs. voltage performance of a 7-cell thermal energy harvester circuit in accordance with the present invention. The maximum current was approximately 7.4 A.

Figure 8A:
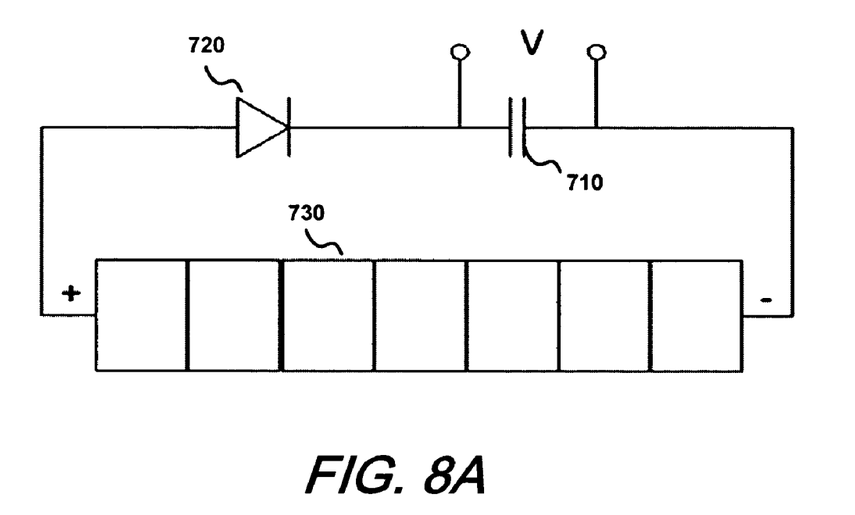
FIG. 8A is a schematic diagram of a circuit with an exemplary thermal harvesting device in accordance with the present invention.
Figure 8B:
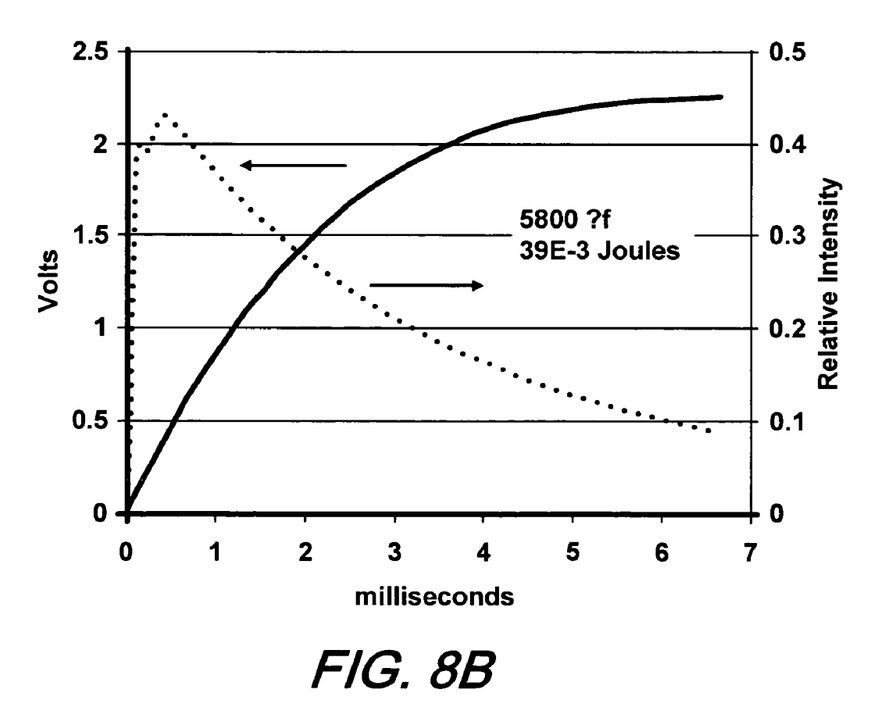
FIG. 8B is a timing diagram illustrating the performance of the circuit.

To emulate the actual situation for a projectile in flight, a 7-cell thermal energy harvester was constructed and coupled in a circuit as shown in FIG. 8A. In the circuit of FIG. 8A, the harvester 730 is coupled in series with a capacitor 710 and a diode 720. The harvester 730 was exposed to varying pulses of light and the voltage across the capacitor 710 was measured. A 5800 μF capacitor was used. FIG. 8B shows the resultant capacitor voltage and relative light level versus time during a flash lamp pulse. As shown, the intensity of the flash increases to over 50% of its peak value in approximately 0.1 ms, remains within 10% of the peak value for 0.7 ms, and then decays exponentially for a period of several milliseconds. The capacitor charges to approximately 2.3 volts in 7 ms, storing approximately 0.039 Joules of energy.

EM Energy Harvesting

EM energy harvesting entails the transducing of electromagnetic energy into electrical power. As described above, in an exemplary munitions energy system, EM energy harvesting can be used to provide power for at least a minimal functionality during the time that the munition is sitting inside the breech of a gun before it is launched or during a maintenance mode.

Figure 9A:
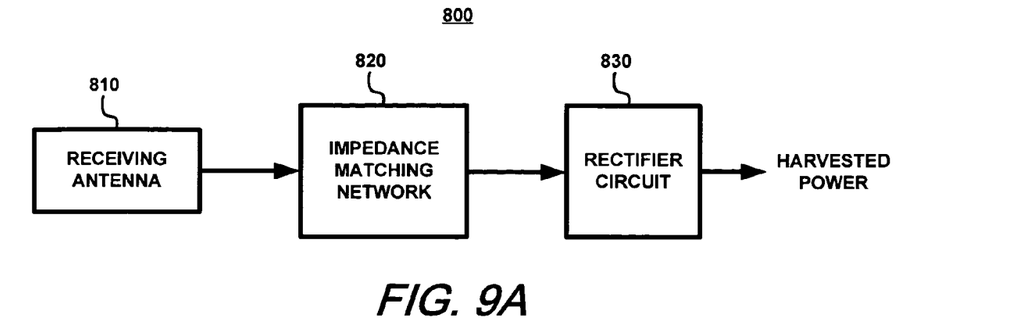
FIG. 9A is a block diagram of an exemplary embodiment of an electromagnetic energy harvester in accordance with the present invention.
Figure 9B:
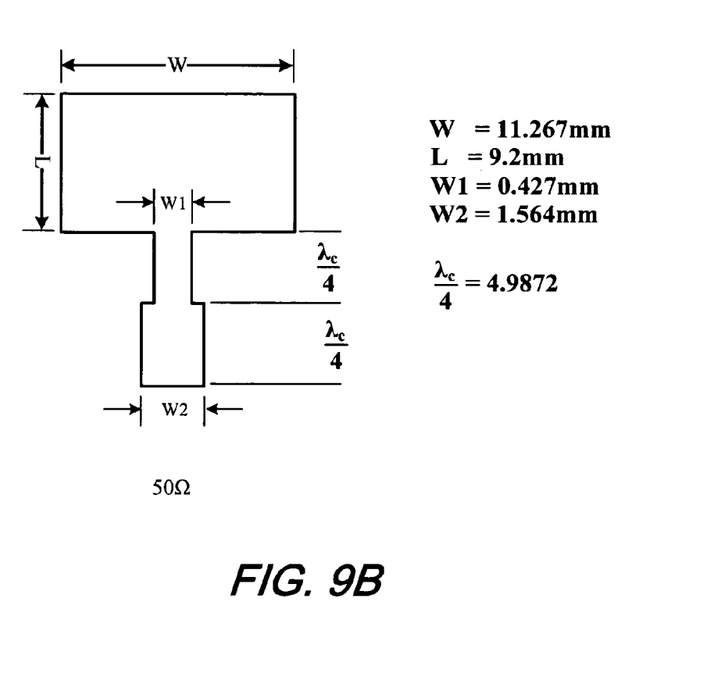
FIG. 9B shows an exemplary embodiment of an antenna and feeding arrangement for said harvester.

FIG. 9A shows a block diagram of an exemplary embodiment of an EM energy harvester 800 in accordance with the present invention. The harvester 800 includes a receiving antenna 810, an impedance matching network 820, and a rectifier circuit 830. As shown in FIG. 9B, the antenna can be implemented in a variety of known ways, and preferably in microstrip patch form which has the advantages of being lightweight, can be fabricated at low cost, and can be easily integrated with microwave circuitry. The antenna feed lines and matching network can be fabricated simultaneously with the patch antenna structure using microstrip technology. The embodiment shown in FIG. 9B includes a direct feed arrangement with a quarter wavelength transformer. In an exemplary embodiment using RT Duriod 5880 material, with a dielectric constant of 2.2 and substrate thickness of 0.508 mm, a rectangular patch antenna tuned to 2.45 GHz with an impedance of 75 ohms will have dimensions of 11.267 mm by 9.2 mm.

The impedance matching network 820 serves to maximize the power transfer from the antenna 810 to the input of the rectifier circuit 830. The network 820 can be implemented in a variety of known ways. In an exemplary embodiment, the impedance matching network 820 is implemented using microstrip transmission lines, one in series and another in shunt.

The rectifier circuit 830 serves to rectify the signal received at the antenna 810 to a DC signal which can be used to power other devices. The rectifier circuit 830 can be implemented conventionally. In an exemplary embodiment, the rectifier circuit 830 is implemented with a full-wave voltage-doubler Schottky diode circuit.

Figure 10:
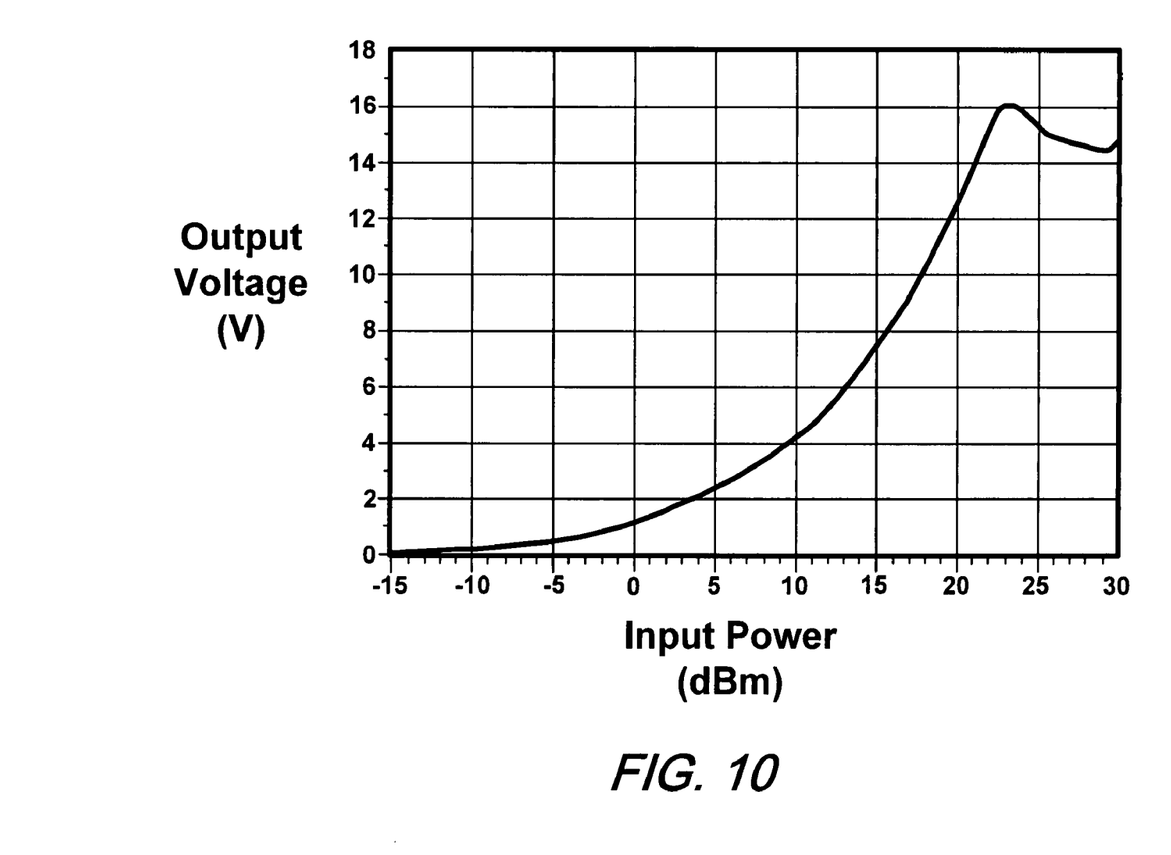
FIG. 10 is a graph of the output voltage of an exemplary EM harvester as a function of input power.

FIG. 10 shows the output voltage of an exemplary EM harvester as a function of the input power received by the EM harvester.

It is understood that the above-described embodiments are illustrative of only a few of the possible specific embodiments that can represent applications of the invention. Numerous and varied other arrangements can be made by those skilled in the art without departing from the spirit and scope of the invention.

What is claimed is:

1. A munitions energy system for providing electrical energy to a munition, the system comprising:
    an energy harvesting device, the energy harvesting device generating electrical energy based on an environmental condition of the munition, wherein the energy harvesting device includes:
        a motion harvesting device which generates electrical energy based on a motion of the munition,
        a thermal harvesting device which generates electrical energy based on a thermal condition of the munition, and
        an electromagnetic harvesting device which generates electrical energy based on electromagnetic radiation received by the munition;
    an energy storage device, the energy storage device storing electrical energy generated by the energy harvesting device; and
    an energy management device, the energy management device managing the flow of energy among the energy harvesting device and a load, the energy harvesting device and the energy storage device, and the energy storage device and the load, wherein the energy management device manages the flow of energy in a maintenance mode and an operational mode of the munition.

2. The system of claim 1, comprising a reserve energy source which provides electrical energy, wherein the energy management device manages the flow of energy between the reserve energy source and the load.

3. The system of claim 1, wherein the energy storage device includes a capacitor.

4. The system of claim 1, wherein the motion harvesting device includes a mechanical force storage element and a piezoelectric element which generates electrical energy based on a force applied by the mechanical force storage element.

5. The system of claim 1, wherein the thermal harvesting device includes an infrared radiation detector which generates electrical power from infrared radiation emitted by an external surface of the munition.

6. The system of claim 1, wherein the electromagnetic radiation includes radio frequency radiation.

7. The system of claim 6, wherein the radio frequency radiation is received by the munition via a gun barrel, wherein the gun barrel acts as an electromagnetic waveguide.

8. The system of claim 6, wherein the radio frequency radiation is modulated in accordance with information.

9. The system of claim 1, wherein the operational mode includes:
    a communication phase, during which the electromagnetic harvesting device generates electrical energy based on the electromagnetic radiation of a radio frequency communication received by the munition;
    an acceleration phase, during which the motion harvesting device generates electrical energy based on an axial setback acceleration experienced by the munition; and
    a flight phase, during which the thermal harvesting device generates electrical energy based on heating experienced by the munition.

10. The system of claim 9, comprising a reserve energy source which provides electrical energy, wherein the reserve energy source is initiated during the acceleration phase and provides power during the flight phase and wherein the energy management device manages the flow of energy between the reserve energy source and the load.

11. The system of claim 1, wherein the maintenance mode includes:
    a communication phase, during which the electromagnetic harvesting device generates electrical energy based on the electromagnetic radiation of a radio frequency communication received by the munition.

12. The system of claim 11, wherein the communication phase is followed by a sleep phase.

* * * * *